United States Patent [19]
Matsuno et al.

[11] Patent Number: 5,979,378
[45] Date of Patent: Nov. 9, 1999

[54] DIAGNOSIS APPARATUS FOR DIAGNOSING VARIABLE VALVE TIMING MECHANISM

[75] Inventors: Osamu Matsuno; Hiroshi Abe, both of Kanagawa-ken, Japan

[73] Assignee: Nissan Motor Co., Ltd., Kanagawa-ken, Japan

[21] Appl. No.: 08/886,002

[22] Filed: Jun. 30, 1997

[30] Foreign Application Priority Data

Jul. 3, 1996 [JP] Japan ................................. 8-173999

[51] Int. Cl.⁶ ................................................ F02D 13/00
[52] U.S. Cl. .................................. 123/90.15; 123/90.17; 701/114
[58] Field of Search ......................... 701/114; 123/90.11, 123/90.15, 90.17, 90.31, 90.32, 90.16

[56] References Cited

U.S. PATENT DOCUMENTS

| | | | |
|---|---|---|---|
| 5,327,856 | 7/1994 | Schroeder et al. | 123/90.11 |
| 5,363,817 | 11/1994 | Ikeda et al. | 123/90.15 |
| 5,494,007 | 2/1996 | Schroeder et al. | 123/90.11 |
| 5,522,352 | 6/1996 | Adachi et al. | 123/90.15 |
| 5,562,071 | 10/1996 | Urushihata et al. | 123/90.15 |
| 5,598,814 | 2/1997 | Schroeder et al. | 123/90.11 |
| 5,611,304 | 3/1997 | Shinojima | 123/90.15 |
| 5,626,108 | 5/1997 | Kato et al. | 123/90.15 |
| 5,715,779 | 2/1998 | Kato et al. | 123/90.15 |

FOREIGN PATENT DOCUMENTS 4-112908  4/1992  Japan.

*Primary Examiner*—Willis R. Wolfe
*Assistant Examiner*—Hieu T. Vo
*Attorney, Agent, or Firm*—McDermott, Will & Emery

[57] ABSTRACT

Faults in a variable valve timing mechanism can be accurately diagnosed without influence of a detection error by a crank angle sensor and the like. A phase difference of a crank angle between a standard angular signal REF output from the crank angle sensor and a phase detection signal detected at a predetermined angular position of a cam shaft is counted every control state of the variable valve timing mechanism. Next, a variation between a phase difference counted at a time of OFF control state and a phase difference counted at a time of ON control state is calculated as a diagnosis parameter. Then, in the case that the diagnosis parameter is smaller than a standard value for determination, a fault in the variable valve timing mechanism is determined.

9 Claims, 7 Drawing Sheets

SOLENOID ON (EXCITED)

SOLENOID OFF (NON-EXCITED)

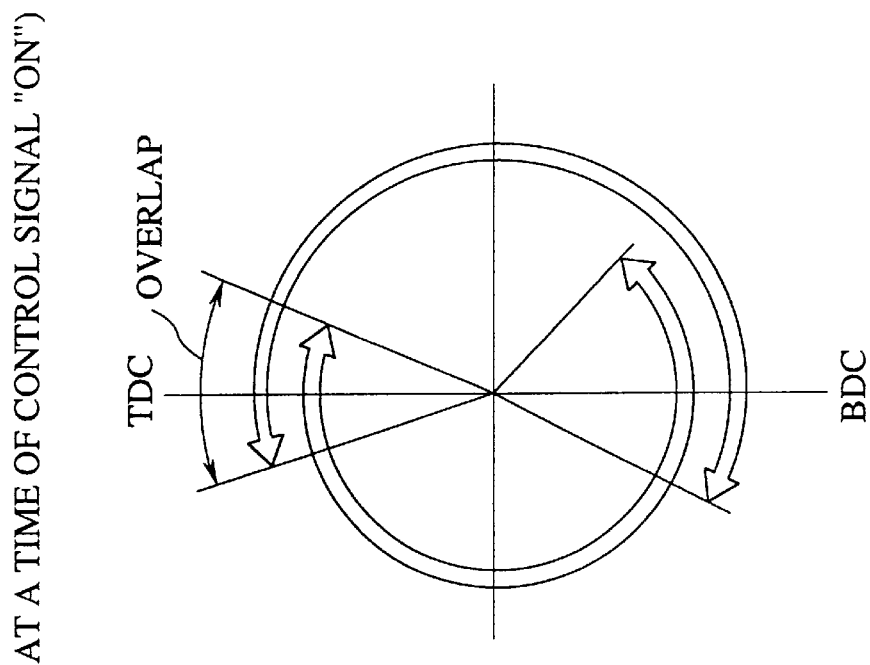
FIG.4B (AT A TIME OF CONTROL SIGNAL "ON")
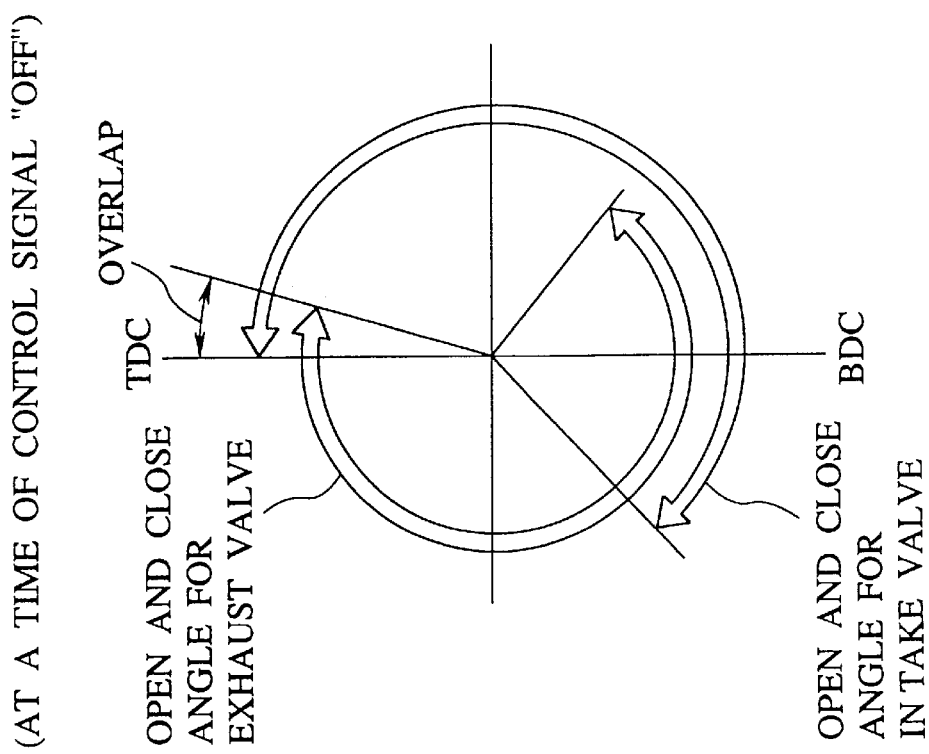
FIG.4A (AT A TIME OF CONTROL SIGNAL "OFF")

DIAGNOSIS APPARATUS FOR DIAGNOSING VARIABLE VALVE TIMING MECHANISM

BACKGROUND OF THE INVENTION

1. Field of the Invention

The present invention relates to a diagnosis apparatus for diagnosing a variable valve timing mechanism, more particularly to a diagnosis apparatus for diagnosing a variable valve timing mechanism which switches a phase of a cam shaft of an internal combustion engine with respect to a crank shaft in correspondence to an operational condition and switches an open and close timing of an intake and/or exhaust valve in correspondence to the operational condition, in which whether or not the switching of the phase is normally performed is diagnosed.

2. Description of the Related Art

A conventional diagnosis apparatus in a variable valve timing mechanism which switches a phase between a crank shaft and a cam shaft so as to control an open and close timing of an intake and/or exhaust valve is disclosed in Japanese Patent Application Laid-Open No.4-112908.

The apparatus is provided with a sensor for detecting a predetermined angular position of the crank shaft, a sensor for detecting a predetermined angular position of the cam shaft, and is structured such as to calculate a phase difference of a crank angle between the crank shaft and the cam shaft on the basis of detected signals from these sensors and to diagnose a fault on the basis of a fact that whether or not the phase difference of the crank angle becomes a value corresponding to a control state of the variable valve timing mechanism.

In the above-described conventional diagnosis apparatus, if there is an error in the detected position detected by the sensor for detecting the crank angle and the sensor for detecting the phase of the cam shaft, a dispersion occurs in the detected phase difference so that there is a fear that a fault is erroneously diagnosed because the predetermined phase difference is not obtained even when the mechanism is normally operated or inversely a normal operation is erroneously diagnosed even when the predetermined phase difference is not obtained. Accordingly, there is a problem that it is difficult to accurately diagnose an error of a small phase angle.

SUMMARY OF THE INVENTION

The present invention is made by taking the above-described problem into consideration and an object of the present invention is to provide a diagnosis apparatus for accurately diagnosing whether or not a switching of a phase difference between a crank shaft and a cam shaft is normally performed by a variable valve timing mechanism even if a position detected by a sensor includes an error.

Further, another object of the present invention is to provide a diagnosis apparatus for easily and accurately diagnosing a phase difference while avoiding an influence of the error by the sensor.

In order to solve the above-described object, according to an aspect of the present invention, there is provided a diagnosis apparatus for diagnosing a variable valve timing mechanism which switches a phase of a cam shaft with respect to a crank shaft response to operational conditions, wherein said variable valve timing mechanism assumes a plurality of control states, the diagnosis apparatus comprising means for detecting a phase difference between the crank shaft and the cam shaft for every control state of the variable valve timing mechanism and diagnosing a fault of the variable valve timing mechanism on the basis of a variation in the phase difference for every control state.

According to another aspect of the present invention, there is provided a diagnosis apparatus for diagnosing a variable valve timing mechanism which switches a phase of a cam shaft with respect to a crank shaft response to operational conditions and switches a open and close timing of an intake and/or exhaust valve response to the operational conditions, the diagnosis apparatus comprising: a standard angle detector for outputting a signal of a standard angle at a predetermined angular position of the crank shaft; a phase detector for outputting a signal of a phase detection at a predetermined angular position of the cam shaft; a phase difference detector for detecting a phase difference of the crank angle from said standard angular signal to said phase detection signal for every control state of said variable valve timing mechanism; a variation calculating circuit for calculating a variation of the phase difference detected by the phase difference detector for every control state; and a fault diagnosing circuit for diagnosing a fault in said variable valve timing mechanism by comparing the variation calculated in the variation calculating means with a standard value previously set.

In accordance with the structure according to the above aspects of the invention, even if the error exists in the phase difference detected every control state, the variation in the phase difference detected every control state is calculated so as to exclude an influence of the error, thereby detecting a rotating angle of the cam shaft by the variable valve timing mechanism with a great accuracy.

In a preferred embodiment of the present invention, an unit angle detector for outputting an unit angular signal for every unit crank angle is provided and said phase difference detector counts the number of said unit angular signal generated between said standard angular signal and said phase detection signal to detect said phase difference of the crank angle.

In accordance with the above structure, the phase difference of the crank angle is detected when the unit crank angle is considered to be a minimum resolution.

In a preferred embodiment of the present invention, a free run counter for counting the unit angular signal is provided and the phase difference detector detects the phase difference of the crank angle on the basis of both a value of the free run counter at a time when the standard angular signal is generated and a value of the free run counter at a time when the phase detection signal is generated.

In accordance with the above structure, a number of the unit angular signal generated between the standard angular signal and the phase detection signal is calculated by subtracting the value of the free run counter at a time when the standard angular signal is generated from the value of the free run counter at a time when the phase detection signal is generated.

In a preferred embodiment of the present invention, a standard signal period counter for counting the unit angular signal is provided, the counter being cleared upon every the standard angular signal, and a value calculated by subtracting the value of the standard signal period counter from the value of the free run counter is used as a value of the free run counter at a time when the standard angular signal is generated.

In accordance with the above structure, when the phase difference of the crank angle is calculated at a standard time when a special standard angular signal is generated, even in the case that a determination operation of determining whether or not the standard angular signal is a standard of the phase detection is performed later than the time when the standard angular signal is generated, a value of the free run counter at a time when the standard signal as a standard for detecting the phase is generated can be detected by subtracting the value of the standard signal period counter from the value of the free run counter at a time when the standard angular signal to be as a standard for detecting the phase is determined.

In a preferred embodiment of the present invention, the variable valve timing mechanism is provided in each of a plurality of cam shafts, the phase detector is provided in each of a plurality of cam shafts and the phase difference detector reads phase detection signals from the plurality of phase detector in an independent manner to each other so as to detect the phase difference for every cam shaft and for every control state.

In accordance with the above structure, for example, in the case that the variable valve timing mechanism is provided on every bank in a V internal combustion engine, a diagnosis can be performed every bank without that the phase detection signal from one bank does not affect to a detection of the phase difference in the other bank.

In a preferred embodiment of the present invention, a diagnosis range setting means is provided, the diagnosis range setting means restrictively setting a range of a crank angle for detecting the phase difference on the basis of the phase detection signal from the phase detector response to the standard angular signal from the standard angle detection means.

In accordance with the above structure, for example, in the structure in which the phase detection signal is output by detecting a portion to be detected (a projecting portion or a recess portion) provided on the cam shaft by means of a magnetic sensor, even in the case that the detected signal is not output by that the magnetic sensor responds to the other portion than the portion to be essentially detected; the diagnosis range is specified to a range in which the phase detection signal corresponding to the essentially detected portion is expected to be output so that the diagnosis can be performed without influence of the detected signals generated by responding to the other portion than the essentially detected portion.

In a preferred embodiment of the present invention, a diagnosis allowing means is provided, the diagnosis allowing means being structured such that only when only one phase detection signal is detected from the phase detector in a range of the crank angle for detecting the phase difference set by the diagnosis range setting means, the fault diagnosis is performed by the fault diagnosis circuit on the basis of the phase detection signal.

In accordance with the above structure, when two or more phase detection signals are detected in a diagnosis range originally set for outputting only one phase detection signal, the diagnosis apparatus presumes that a false phase detection signal is generated by a superposition of noise and the like and can stop diagnosing. Further, when no phase detection signal is detected within the diagnosis range, fault or the like is presumed in the phase detection means and the diagnosis can be stopped.

In a preferred embodiment of the present invention, the variable valve timing mechanism has plural control states including one control state when a solenoid is energized and an other control state when the solenoid is not energized.

The nature, principle and utility of the invention will become more apparent from the following detailed description when read in conjunction with the accompanying drawings.

BRIEF DESCRIPTION OF THE DRAWINGS

In the accompanying drawings:

FIG. 4A is a drawing which shows an open and close timing of an intake valve in an OFF control state of the variable valve timing mechanism;

FIG. 4B is a drawing which shows a open and close timing of the intake valve in an ON control state of the variable valve timing mechanism;

DETAILED DESCRIPTION OF THE EMBODIMENT

An embodiment of the present invention will be explained below with reference to the attached drawings.

Figure 1:
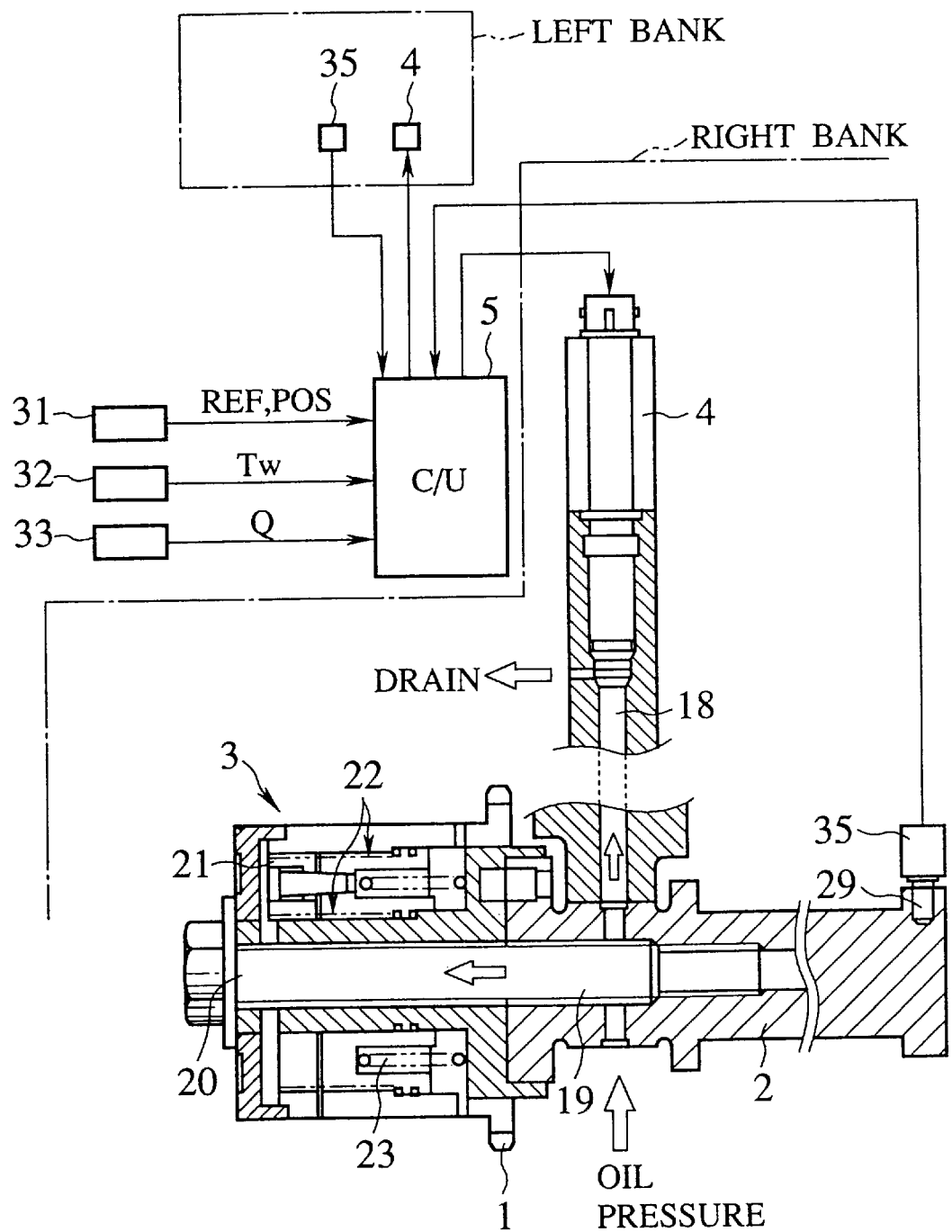
FIG. 1 is a schematic diagram which shows a system of a variable valve timing mechanism in accordance with an embodiment of the present invention.

FIG. 1 is a diagram which shows a variable valve timing mechanism in accordance with the present embodiment. An internal combustion engine provided with the variable valve timing mechanism is a V internal combustion engine and is structured such as to include an intake side cam shaft and an exhaust side cam shaft in each of banks in an independent manner and to include a variable valve timing mechanism as shown in FIG. 1 in the intake side cam shaft of each bank.

The variable valve timing mechanism as shown in FIG. 1 comprises a phase switching mechanism 3, which is mounted to an intake side cam sprocket 1, for switching a phase between a crank shaft (not shown) and an intake side cam shaft 2, a variable valve timing control solenoid 4 for controlling supply of drive oil pressure to the phase switching mechanism 3, and a control unit 5 for outputting an ON and OFF control signal to the variable valve timing control solenoid 4.

Figure 2:
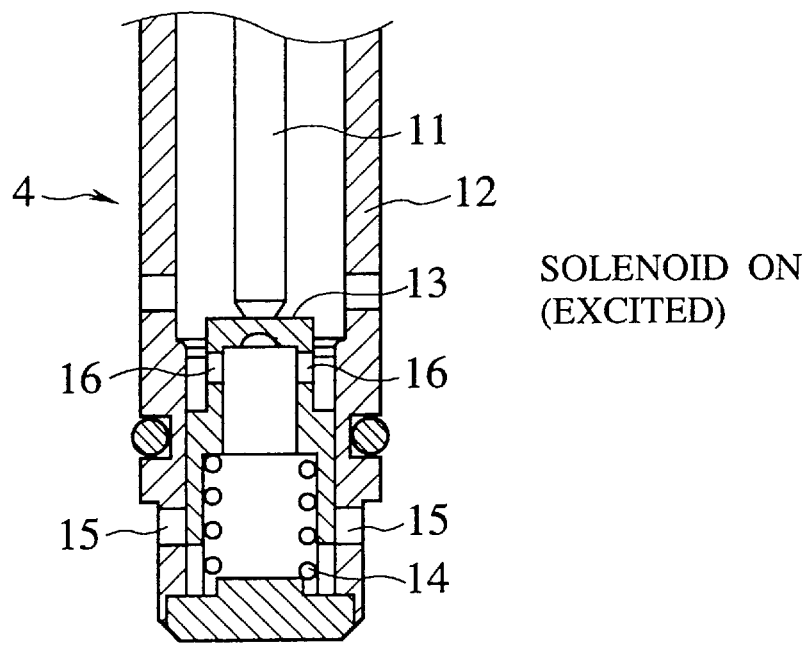
FIG. 2 is a drawing which shows a state of an oil passage in an ON control state of the variable valve timing mechanism.
Figure 3:
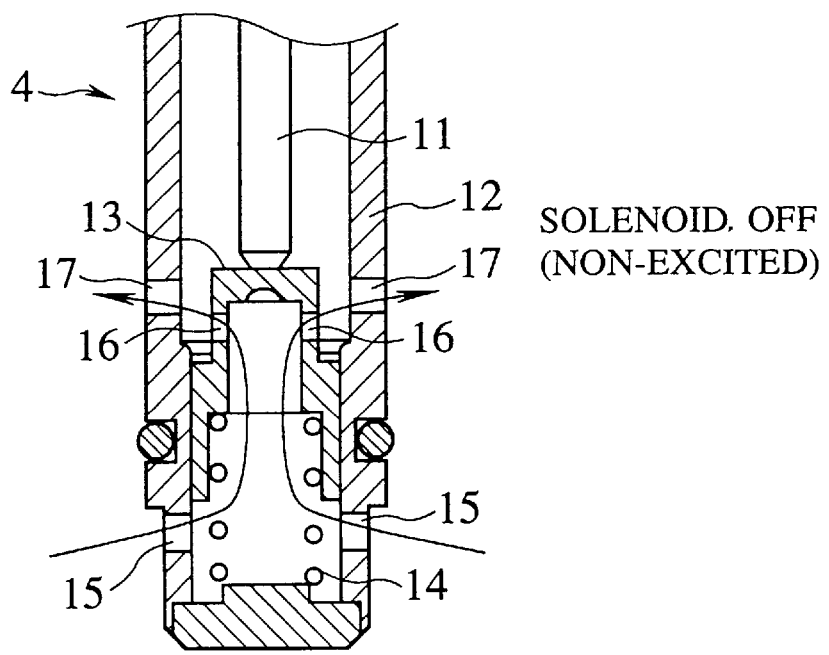
FIG. 3 is a drawing which shows a state of the oil passage in an OFF control state of the variable valve timing mechanism.
Figure 5:
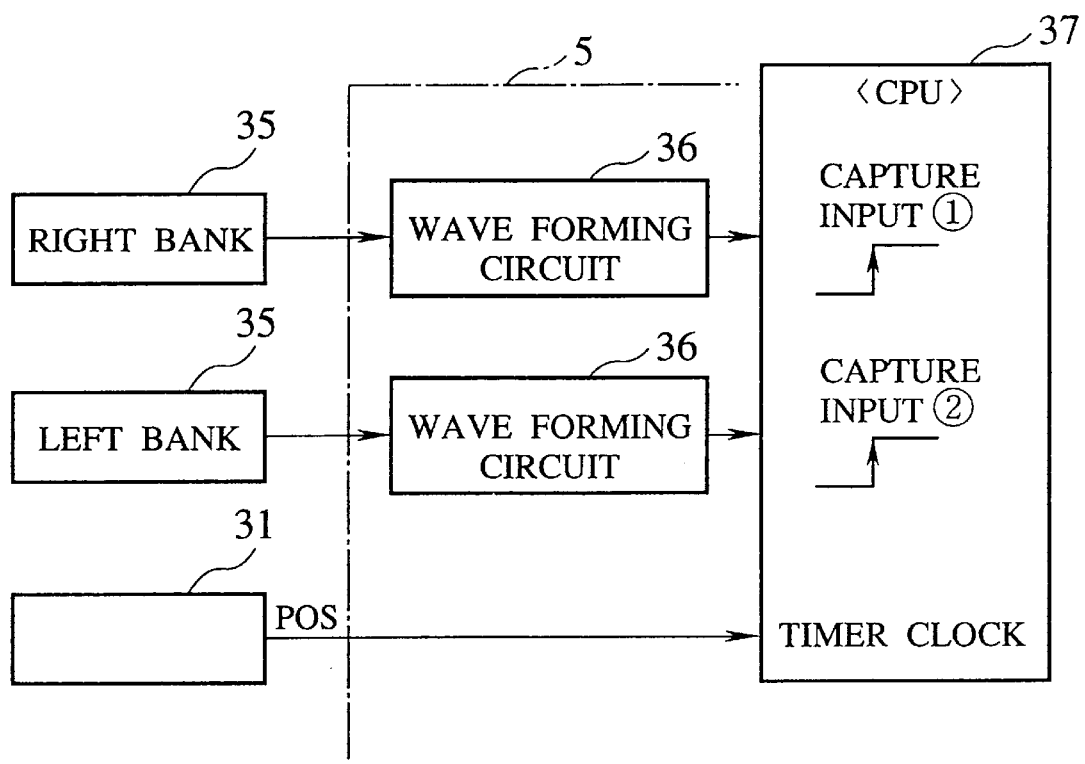
FIG. 5 is a block diagram which shows an operation circuit of a phase detection signal in accordance with the embodiment.

The variable valve timing control solenoid 4 is structured such as to, as shown in FIGS. 2 and 3, retreat in a direction that a rod 11 moves close to the solenoid in an OFF (non-excited) state of a solenoid body (not shown) provided in a base end side (an upper side in FIGS. 2 and 3) and to advance in a direction that a rod 11 moves apart from the solenoid in an ON (excited) state of a solenoid body.

While within a front end portion of a housing 12 supported in such a manner as to surround the rod 11, a cylindrical valve body 13 is inserted in such a manner as to be guided along an inner peripheral surface of the housing 12 and to move in an axial direction. This valve body 13 is urged to the rod 11 side by a coil spring 14 which is disposed between the front end of the housing 12 and the valve body 13. The valve body 13 is in contact with a front end of the rod 11 by the urging force so that the valve body 13 is moved in the axial direction together with advancing and retreating of the rod 11.

Further, on a peripheral wall of the housing 12 in a front end thereof, an introduction hole 15 is provided for the purpose of introducing a hydraulic fluid supplied in pressure from a oil pressure source (not shown) to a space surrounded by the inner peripheral surface of the housing 12 and the inner side of the valve body 13. The valve body 13 is provided with a communication hole 16 for discharging the hydraulic fluid introduced through the introduction hole 15 to a space surrounded by the inner peripheral surface of the housing 12 close to the valve body 13 and the outer peripheral surface of the rod 11. Further, a drain hole 17 is opened to the peripheral wall of the housing 12 in such a manner as to face a space surrounded by the inner peripheral surface of the housing 12 and the outer peripheral surface of the rod 11.

In this structure, in an OFF (non-excited) state of the variable valve timing control solenoid 4, the valve body 13 comes apart from the front end of the housing 12 by retreating the rod 11 in the side close to the solenoid, and in this state the peripheral wall of the valve body 13 does not interfere in the introduction hole 15, and the hydraulic fluid is introduced to the housing 12 through the introduction hole 15, moves within the housing 12 through the communication hole 16 and is discharged from the drain hole 17.

In contrast of this, in an ON (excited) state of the variable valve timing control solenoid 4, since the valve body 13 goes down to the front end of the housing 12 by advancing the rod 11 in the side close to the valve body 13 so that the peripheral wall of the valve body 13 close the introduction hole 15 inside thereof, the hydraulic fluid is not discharged through the drain hole 17.

A hydraulic fluid passage 18 communicating with the introduction hole 15 is communicated with a hydraulic fluid passage of the phase switching mechanism 3 in an upstream side thereof so that in the OFF state of the solenoid 4, oil pressure does not affect to the phase switching mechanism 3 by discharging the hydraulic fluid through the drain hole 17 and when the solenoid 4 is turned to the ON state so as to close the drain hole 17, the oil pressure affects to the phase switching mechanism 3.

The hydraulic fluid passage 18 is communicated with a hydraulic fluid passage 19 arranged on the cam shaft 2 prior to the solenoid 4 so that in when the hydraulic fluid is not discharged from the solenoid 4 in the ON state of the solenoid 4, the hydraulic fluid supplied to the hydraulic fluid passage 19 reach a front surface of a plunger 21 including a cam sprocket 1 within through a hydraulic fluid passage 20 arranged in the cam sprocket 1. Then, the hydraulic fluid reaching the front surface of the plunger 21 acts to press the plunger 21 toward the cam shaft 2 by an oil pressure thereof.

Since the plunger 21 engages with the cam sprocket 1 and the cam shaft 2 by a helical gear 22, when the plunger 21 is pressed by the oil pressure, the plunger 21 moves in the axial direction to a stopper position while rotating. In this situation, since the cam sprocket 1 is fixed by a timing chain (not shown), the cam shaft 2 is rotated together with the plunger 21 so that the cam sprocket 1 and the cam shaft 2 changes their relative position in the peripheral direction.

As a result of this, the phase of the crank shaft and the cam shaft is changed.

In contrast of this, when the control solenoid 4 is turned to OFF, the hydraulic fluid is discharged through the drain hole 17 of the solenoid 4 so that a force for pressing the plunger 21 toward the cam shaft 2 runs short and the plunger 21 is returned to the original position apart from the cam shaft 2 by an urging force of a return spring 23.

In a manner mentioned above, in the variable valve timing mechanism in accordance with the present embodiment, a phase of the intake cam can be changed with a constant operating angle by changing the phase of the intake cam shaft 2 with respect to the crank shaft. As shown in FIGS. 4A and 4B, In the OFF state of the solenoid 4, an opening timing of the intake valve is delayed, and opposite in the ON state of the solenoid 4, the opening timing of the intake valve is hastened so that an overlap amount against the exhaust valve is increased.

The ON and OFF operation of the solenoid 4 is controlled by a control signal from the control unit 5. In order to perform the ON and OFF operation of the solenoid in correspondence to an operating condition of the engine, and in order to change the open and close timing of the intake valve in correspondence to a driving condition, the control unit 5 is input a standard angular signal REF from a crank angle sensor, an unit angular signal POS, a water temperature signal Tw from a water temperature sensor and an intake air flow signal Q from a air flow meter 33.

The crank angle sensor 31 comprises a signal plate which is axially supported to the cam shaft close to the exhaust without the variable valve timing mechanism in the one bank and which integrally rotates together with the exhaust side cam shaft and a sensor portion which optically detects slits formed on the signal plate.

The slits formed on the signal plate comprises a set of slits for an unit signal formed along a peripheral direction thereof every unit angle and a set of slits for a standard signal formed along a peripheral direction at every 60 degrees in the engine having 6 cylinders. Two independent sensor portions are respectively arranged for detecting these two slit sets. Then, the unit angular signal POS every unit crank angle is output by detecting the slits for the unit signal and further the standard angular signal REF every standard crank angle (every 120 degrees CA in the engine having 6 cylinders) is output by detecting the slits for the standard signal. In this structure, the slits for the standard signal is formed in such a manner as to have a different width to each other so that a pulse width of the standard angular signal REF is different from each other in every cylinders and determination to the cylinder is performed by determining the pulse width of the standard angular signal REF.

An engine speed Ne can be calculated by counting a period of the standard angular signal REF or by counting a number of the unit angular signal POS generated in an unit time.

In this structure, the crank angle sensor 31 corresponds to a standard angle detector and an unit angle detector.

A control unit 5 which includes a micro computer determines the ON and OFF operation of the solenoid 4 on the basis of the operation conditions such as the intake air flow amount Q, the engine speed Ne, the water temperature Tw and the like, and outputs an ON and OFF control signal in correspondence to the determination to the solenoid 4 of each of the banks.

Further, the control unit 5 has a function capable of performing a fault diagnosis of the variable valve timing mechanism having the above structure. In order to diagnose the above-described fault, a magnetic sensor 35 which serves as a phase detector for outputting a detection signal (hereinafter refer to the phase detection signal) at a redetermined position of the cam shaft is provided in the intake side cam shaft 2 in each of the banks in which the above-described variable valve timing mechanism is arranged.

The magnetic sensor 35 is disposed in the opposite end to the end in which the variable valve timing mechanism of the cam shaft 2 is provided, and detects a recess portion 2a (which may be a projecting portion) formed in a predetermined angular position of the cam shaft 2 so as to output the phase detection signal.

The phase detection signal from the magnetic sensor 35 arranged in each of the banks is formed as a wave shape of a pulse signal which rises (or falls) at a 0 cross point by a wave shape forming circuit 36. Then, each of the phase detection signal after wave shape forming in the above mentioned manner is input to a CPU 37 as a capture input and a value of a free run counter (for example, a counter having 2 bite) which counts the unit angular signal POS is captured to a register arranged in correspondence to each of the banks by a leading (or a trailing) edge of the capture input signal as a trigger (refer to FIG. 8).

Figure 8:
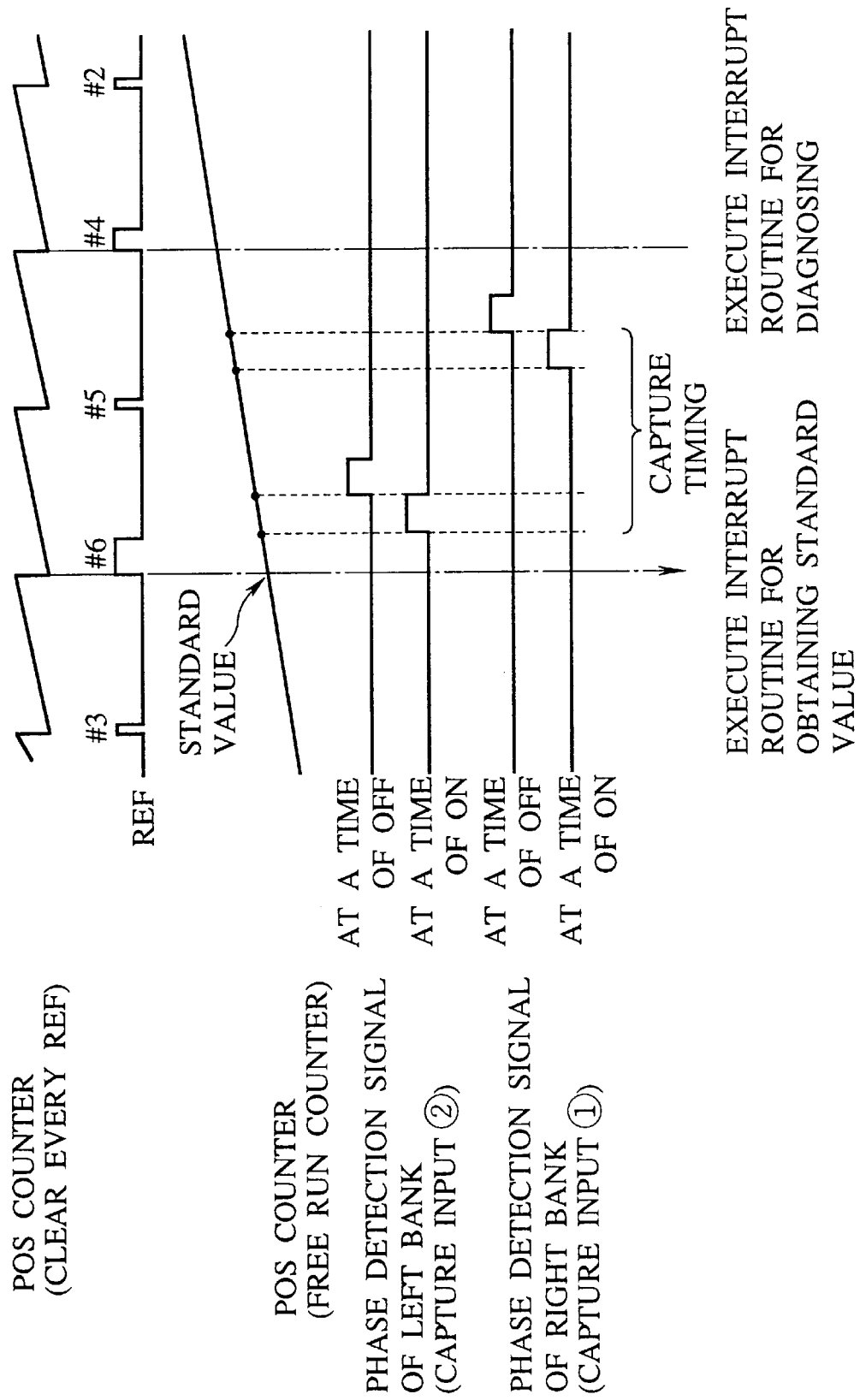
FIG. 8 is a time chart which shows a relation among a standard angular signal REF, a phase detection signal and a POS counter in accordance with the embodiment.

The phase detection signal (the pulse signal after the wave shape forming) from each of the magnetic sensor 35 and the standard angular signal REF from the standard crank angle sensor 31 are set such as to be output with a relation as shown in FIG. 8, in the present embodiment.

Accordingly, in both of the ON control state and the OFF control state of the solenoid 4, the phase detection signal of both of the banks are generated between the standard angular signal REF in correspondence to the sixth cylinder and the standard angular signal REF in correspondence to the fourth cylinder. In the following description, the standard angular signal REF in correspondence to the sixth cylinder is used as a standard signal for phase detection which shows a predetermined angular position of the crank shaft.

Figure 6:
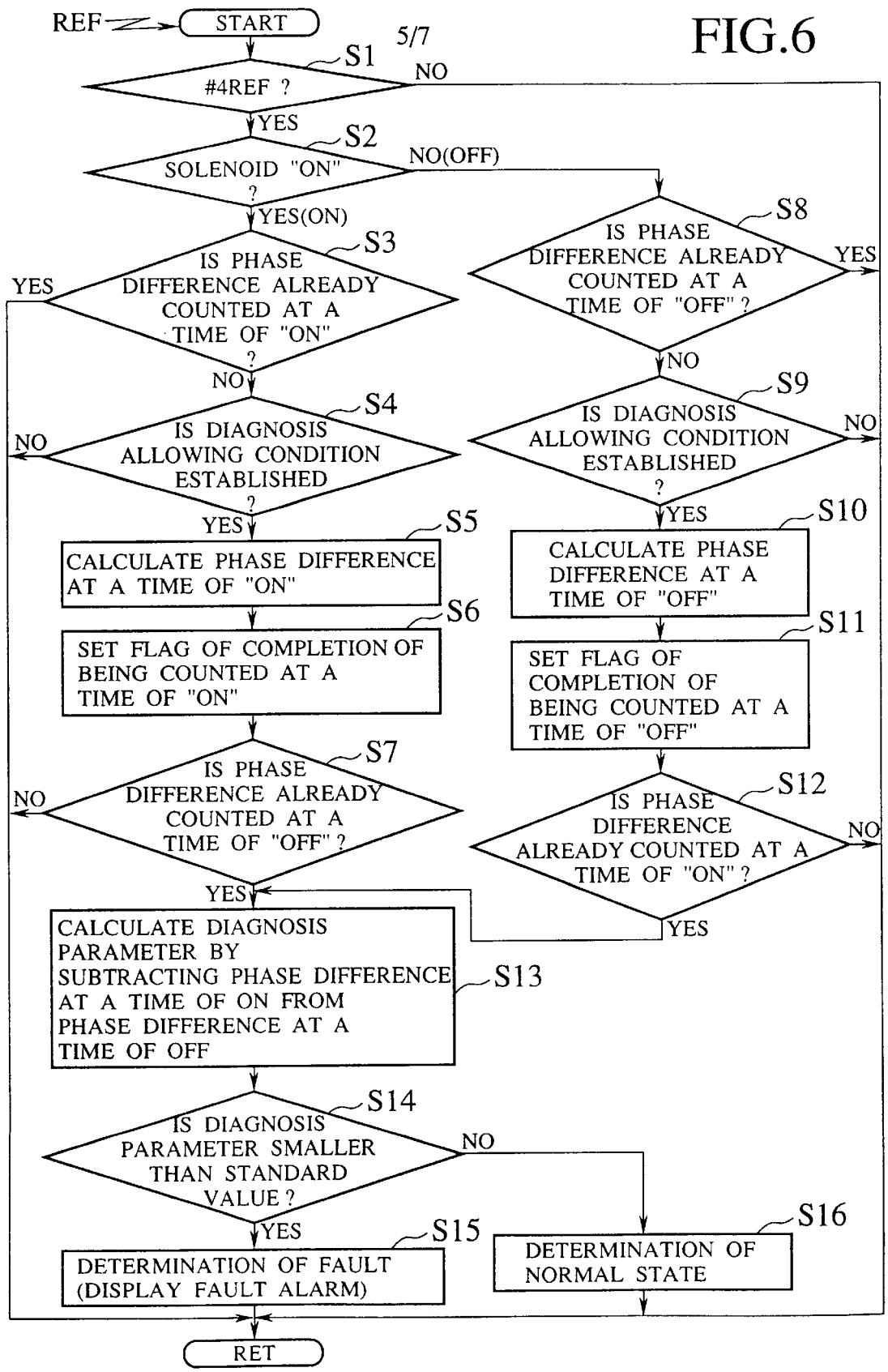
FIG. 6 is a flow chart which shows a diagnosis routine in accordance with the embodiment.

Fault diagnosis in the control unit 5 will be explained below with reference to a diagnosis routine of a flow chart as shown in FIG. 6. The diagnosis routine of the flow chart as shown in FIG. 6 shows common contents to the respective banks, and the routine as shown in FIG. 6 is performed in parallel by using each of the phase detection signals independently input to each of the banks.

The flow chart shown in FIG. 6 is interruptory performed when the standard angular signal REF rises. At first in a step S1, whether or not the standard angular signal REF which is a base for the interrupt operation of this time is a signal in correspondence to the fourth cylinder as shown in FIG. 8 is determined and when the standard angular signal REF is not the signal in correspondence to the fourth cylinder, the routine is terminated.

In contrast of this, when the standard angular signal REF is the signal in correspondence to the fourth cylinder, since a phase detection signal is expected to be detected in the preceding period as shown in FIG. 8, the process proceeds to a step S2 and whether or not the state is the ON control state of the solenoid 4 is determined.

When the state is the ON control state, the process proceeds to a step S3 and whether or not a phase difference of the crank angle between the crank shaft and the cam shaft is already counted is determined.

When the phase difference in the ON control state is not counted yet, the process proceeds to a step S4 and whether or not an allowing condition for diagnosis is formed is determined.

In this structure, it is preferable to allow a diagnosis when only one phase detection signal is detected in each of the banks between the standard angular signal. REF in correspondence to the sixth cylinder and the standard angular signal REF in correspondence to the fourth cylinder (hereinafter refer to the diagnosis range) which corresponds to a range where the phase detection signal is generated (diagnosis range setting means).

In the present embodiment, since the phase detection signal is output at only one time within the diagnosis range regardless of the ON or OFF of the solenoid 4, when a plurality of output is made within the diagnosis range, it is determined that a fault phase detection signal is generated by the fact that the noise is superposed on the output line of the phase detection signal. In this case, since the phase of the cam shaft can not rightly be detected, the diagnosis is not allowed. When the phase detection signal is not detected within the diagnosis range at all, it is presumed that the magnetic sensor 35 is troubled or the output line of the phase detection signal is broken. In this case, since the phase of the cam shaft is not detected, the diagnosis is not allowed (diagnosis allowing means).

It is preferable to employ, as a diagnosis condition, that the crank angle sensor 31 is diagnosed so that the crank angle sensor 31 is not troubled.

Further it is preferable to employ a condition that more than a predetermined time period has passed after switching to the ON control state and a phase switching is certainly completed in the variable valve timing mechanism and further employ a condition that a water temperature and an engine speed is within a predetermined range.

When the diagnosis is allowed, the process proceeds to a step S5 and a number of the unit angular signal POS generated between the standard angular signal REF in correspondence to the sixth cylinder and the phase detection signal is calculated as the phase difference of the crank angle between the crank shaft (the cam sprocket) and the cam shaft. The portion of the S5 corresponds to the phase difference detector.

Specifically, a variation between the value of the free run counter (the standard value) at a timing when the standard angular signal REF in correspondence to the sixth cylinder is output and the value of the free run counter captured in the register with the use of the phase detection signal as a trigger, that is, the value of the free run counter at a timing when the phase detection signal is generated, is calculated as the phase difference of the crank angle.

Figure 7:
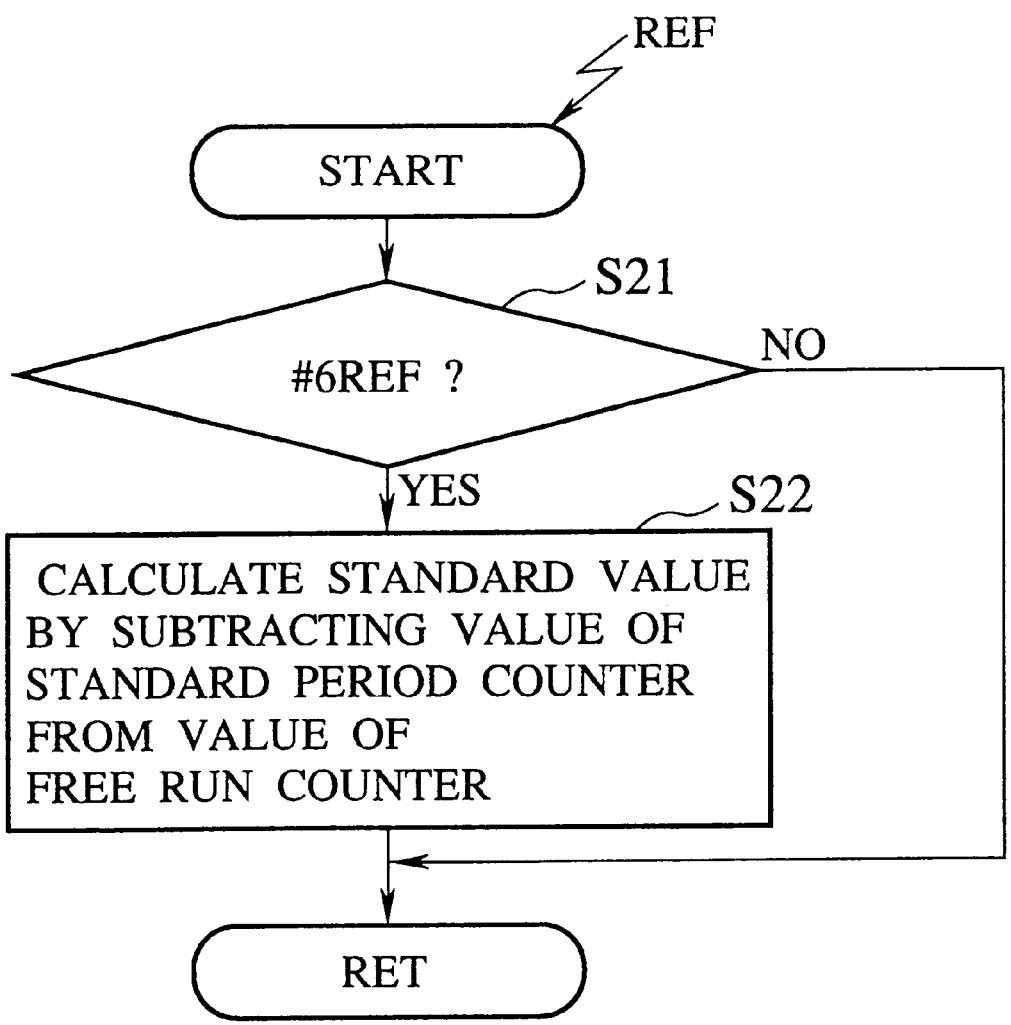
FIG. 7 is a flow chart which shows a routine for determining a standard value for phase detection in accordance with the embodiment.

The standard value is calculated in accordance with the flow chart as shown in FIG. 7.

The flow chart is performed as an interrupt operation at a time when the standard angular signal REF is generated. At first in a step S21, whether or not the standard angular signal REF at this time corresponds to the sixth cylinder is determined.

When the standard angular signal REF is the signal in correspondence to the sixth cylinder, the process proceeds to a step S22 and a result obtained by subtracting a value in a counter (a standard signal period counter) which counts the unit angular signal POS and is cleared in each of the standard angular signal REF from the value of the free run counter at that time is set to the standard value as a value of the free run counter at a time when the standard angular signal REF in correspondence to the sixth cylinder is generated.

As mentioned above, in the case that the structure is made such that the value of the free run counter at a time when the REF in correspondence to the sixth cylinder is calculated, even if the routine as shown in the flow chart of FIG. 7 is delayed from the generation of the standard angular signal REF due to the other interruption routine having higher priority, the value of the free run counter at a time when the REF in correspondence to the sixth cylinder can be detected.

It is possible to detect the phase difference by using only a value of a counter which is cleared every standard angular signal REF. In this case, since the counter is cleared at a time of the standard angular signal in correspondence to the fifth cylinder as shown in FIG. 8, it is required to separate whether the phase detection signal is output before the clear operation or the phase detection signal is output after the clear operation and then to calculate the phase difference. Accordingly, it is preferable to employ the free run counter.

In the case that the free run counter is returned to 0 before the phase detection signal is generated from the REF of the sixth cylinder in FIG. 8, the phase difference is not normally detected. Therefore, it is preferable to apply an operation of canceling the diagnosis when the value of the free run counter captured at a time of generation of the phase detection signal is smaller than the value of the free run counter at a time of generation of the REF of the sixth cylinder which is a standard of a phase detection.

Further, it is possible to make a structure such that the counter is cleared only when the standard angular signal REF output in the other range than the diagnosis range, that is, the standard angular signal REF other than the standard angular signal REF of the fourth, fifth and sixth cylinders is generated so that the counter is never returned to 0 value between the REF of the sixth cylinder and the REF of the fourth cylinder.

Still further, in the structure that the value of the free run counter is captured in the register with the use of the leading edge of the phase detection signal as a trigger, it is preferable to make the other range than the diagnosis range a mask period of the phase detection signal so that even when the phase detection signal is generated in the other range than the diagnosis range, the value of the counter at that time is not captured in the register.

In a step S6, a flag which shows a completion of detecting the phase difference of the crank angle in the ON control state is set.

In a step S7, whether or not counting the phase difference of the crank angel in the OFF control state is completed is determined.

In the case that the counting in the OFF control state is not completed, after the determination in the OFF control state is performed in the step S2, the process proceed to steps S8 to S12 and the phase difference of the crank angle is counted in a similar manner to the time of the ON control state.

Specifically, in the step S8, whether or not the counting of the phase difference in the OFF control state is completed is determined. In the case of not completed, the process proceeds to the step S9 and whether or not the diagnosis allowing condition is accomplished is determined and when the allowing condition is accomplished, the process proceeds to the step S10 which serves as a phase difference detector and the phase difference is calculated.

In the step S11, a flag which shows a completion of counting the phase difference in the OFF control state is set and in the step S12, whether or not the phase difference in the ON control state is already counted is determined.

When the steps S7 and S12 determines that both of the phase difference in the ON control state and the phase difference in the OFF control state are already counted, the process proceeds to a step S13 which serves as a variation calculating circuit.

It is preferable to count each of the phase difference in the ON control state and the phase difference in the OFF control state at a plurality of times and to calculate an average value of each thereof. In calculating the average value, it is preferable to calculate the average value on the basis of the other data than the maximum data and the minimum data in a plurality of phase difference data.

In the step S13, the variation between the phase difference calculated in the OFF control state and the phase difference calculated in the ON control state is calculated as a diagnosis parameter. The diagnosis parameter shows the phase difference of the crank angle between the phase detection signal in the ON control state and the phase detection signal in the OFF control state.

In a step S14, comparison between the diagnosis parameter and the standard value for diagnosis is performed. In the case that the diagnosis parameter is less than the standard value for diagnosis, the process proceeds to a step S15 and a fault in the variable valve timing mechanism is determined so that a driver is alarmed to the fault by an alarm means such as a lamp.

In contrast of this, when the diagnosis parameter is not less than the standard value for diagnosis, the process proceeds to a step S16 and a normal state of the variable valve timing mechanism is determined.

The above-described steps S14 to S16 correspond to a fault diagnosis circuit.

When the variable valve timing mechanism is a mechanism for rotating the cam shaft, for example, at 10 degrees, the diagnosis parameter is expected to be a value in correspondence to the 10 degrees in the normal condition. Accordingly, when a diagnosis parameter in correspondence to an angle significantly smaller than the 10 degrees is calculated, a desired width of a phase variation is not actually obtained even if the ON and OFF control of the variable valve timing mechanism is performed. In this case, it is presumed that a fault has occurred.

For example, as shown in FIG. 8, in the case that the phase difference of the crank angle between the standard angular signal REF of the sixth cylinder and the leading edge of the phase detection signal is 20 degrees at a time that the variable valve timing mechanism is normally operated in the ON state and the phase difference is 30 degrees when the variable valve timing mechanism is normally operated in the OFF state, the diagnosis can be made by determining whether or not an actual phase difference becomes 20 degrees or 30 degrees. However, if there is an error in a detecting position of the magnetic sensor 35 or a generation timing of the standard angular signal REF, there is a possibility that the phase difference does not become 20 degrees or 30 degrees in spite of normal operation of the variable valve timing mechanism so that a fault is erroneously determined. In contrast of this, in accordance with the present embodiment, when the structure is made such that a variation between the phase difference in the ON control state and the phase difference in the OFF control state is calculated, the same influence due to the error is given to each of the phase differences so that the influence due to the error is avoided by calculating the variation. Accordingly, the actual rotating angle of the cam shaft by the variable valve timing mechanism can be determined so that an accurate diagnosis can be performed even if there is a sensor error.

In the above-described embodiment, the V engine is exemplified, however, it is clear that the present invention can be applied to an in-line engine in which only one variable valve timing mechanism to be diagnosed is provided. It is also clear that the diagnosis range is changed by a relation between the detected position by the magnetic sensor and the standard angular signal REF.

Further, it is preferable that after the determination result of normal or fault is given, the diagnosis is inhibited until a key switch is turned OFF and the diagnosis is again performed when the key switch is turned ON and the engine is restarted.

In accordance with the embodiment above described, even if the result of the phase difference detected every control state includes an error, without the influence by the error, there is an effect that whether or not the phase difference is normally switched by the variable valve timing mechanism can be diagnosed.

In accordance with the embodiment above described, there is an effect that the phase difference of the crank angle between the crank shaft and the cam shaft can be easily detected by counting the unit angular signal.

In accordance with the embodiment above described, there is an effect that the phase difference of the crank angle between the crank shaft and the cam shaft can be easily detected by sampling the value of the free run counter for counting the unit angular signal at a time when the standard angular signal is generated and at a time when the phase detection signal is generated, respectively.

In accordance with the embodiment above described, there is an effect that even when the determination for performing the detection of the phase difference is late from the time when the standard angular signal is generated, the detection of the phase difference can be performed by detecting the value of the free run counter at the time when the standard angular signal is generated.

In accordance with the embodiment above described, there is an effect that in the engine comprising the cam shaft and the variable valve timing mechanism being arranged on each cam shaft, the diagnosis can be accurately performed every variable valve timing mechanism.

In accordance with the embodiment above described, there is an effect that the erroneous detection of the angular position of the cam shaft is avoided by limiting the diagnosis range so that an accuracy for diagnosis can be secured.

In accordance with the embodiment above described, there is an effect that the erroneous detection of the phase difference due to superposition of noise and fault in phase detector is avoided so that the diagnosis accuracy of the variable valve timing mechanism can be maintained.

It should be understood that many modifications and adaptations of the invention will become apparent to those skilled in the art and it is intended to encompass such obvious modifications and changes in the scope of the claims appended hereto.

What is claimed is:

1. A diagnosis apparatus for diagnosing a variable valve timing mechanism which switches a phase of a cam shaft with respect to a crank shaft in response to operation conditions, wherein said variable valve timing mechanism selects one of a plurality of variable timing control states, the diagnosis apparatus comprising:

first detecting means for detecting a first phase difference between the crank shaft and the cam shaft in an ON control state of the variable valve timing mechanism;

second detecting means for detecting a second phase difference between the crank shaft and the cam shaft in an OFF control state of the variable valve timing mechanism; and diagnosis means for diagnosing a fault of the variable valve timing mechanism by comparing a difference between said first phase difference and said second phase difference with a predetermined value.

2. A diagnosis apparatus for diagnosing a variable valve timing mechanism according to claim 1, wherein the variable valve timing mechanism has plural control states including one control state when a solenoid is energized and an other control state when the solenoid is not energized.

3. A diagnosis apparatus for diagnosing a variable valve timing mechanism which switches a phase of a cam shaft with respect to a crank shaft in response to operation conditions and switches an open and close timing of at least one of an intake valve an exhaust valve in response to operation conditions, the diagnosis apparatus comprising:

a standard angle detector for outputting a signal of a standard angle at a predetermined angular position of the crank shaft;

a phase detector for outputting a signal of a phase detection at a predetermined angular position of the cam shaft;

a phase difference detector for detecting a first phase difference and a second phase difference of the crank angle from said standard angular signal to said phase detection signal for an ON and an OFF control states of said variable valve timing mechanism respectively;

a different calculating circuit for calculating a difference between the first phase difference and the second phase difference detected by the phase difference detector for every control state; and a fault diagnosing circuit for diagnosing a fault in said variable valve timing mechanism by comparing the difference calculated in the difference calculating means with a standard valve previous set.

4. A diagnosis apparatus for diagnosing a variable valve timing mechanism according to claim 3, wherein an unit angle detector for outputting an unit angular signal for every unit crank angle is provided and said phase difference detector counts the number of said unit angular signal generated between said standard angular signal and said phase detection signal to detect said phase difference of the crank angle.

5. A diagnosis apparatus for diagnosing a variable valve timing mechanism according to claim 4, wherein a free run counter for counting said unit angular signal is provided and said phase difference detector detects the phase difference of the crank angle on the basis of a value of the free run counter at a time when said standard angular signal is generated and a value of the free run counter at a time when said phase detection signal is generated.

6. A diagnosis apparatus for diagnosing a variable valve timing mechanism according to claim 5, wherein a standard signal period counter for counting said unit angular signal is provided, said counter being cleared upon every said standard angular signal, and wherein a value calculated by subtracting the value of said standard signal period counter from the value of said free run counter is used as a value of the free run counter at a time when the standard angular signal is generated.

7. A diagnosis apparatus for diagnosing a variable valve timing mechanism according to claim 3, wherein said variable valve timing mechanism is provided in each of a plurality of cam shafts, said phase detector is provided in each of said plurality of cam shafts and said phase difference detector reads phase detection signals from said plurality of phase detector in an independent manner to each other so as to detect the phase difference for every cam shaft and for every control state.

8. A diagnosis apparatus for diagnosing a variable valve timing mechanism according to claim 3, wherein a diagnosis range setting means is provided, said diagnosis range setting means restrictedly setting a range of a crank angle for detecting said phase difference on the basis of the phase detection signal from said phase detector response to the standard angular signal from said standard angle detector.

9. A diagnosis apparatus for diagnosing a variable valve timing mechanism according to claim 8, wherein a diagnosis allowing means is provided, said diagnosis allowing means being structured such that only when only one phase detection signal is detected from said phase detector in a range of the crank angle for detecting said phase difference set by said diagnosis range setting means, the fault diagnosis is performed by said fault diagnosis circuit on the basis of said phase detection signal.

* * * * *